United States Patent
Brown et al.

(10) Patent No.: US 7,596,285 B2
(45) Date of Patent: Sep. 29, 2009

(54) PROVIDING A PORTION OF AN ELECTRONIC MAIL MESSAGE AT A REDUCED RESOLUTION

(75) Inventors: Michael W. Brown, Georgetown, TX (US); Michael A. Paolini, Austin, TX (US); Newton J. Smith, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 10/787,981

(22) Filed: Feb. 26, 2004

(65) Prior Publication Data

US 2005/0193068 A1 Sep. 1, 2005

(51) Int. Cl.
*G06K 9/32* (2006.01)
*G06F 15/16* (2006.01)

(52) U.S. Cl. .................. 382/299; 382/298; 709/206; 709/246

(58) Field of Classification Search ........... 382/299, 382/298, 300; 709/206, 246
See application file for complete search history.

(56) References Cited

U.S. PATENT DOCUMENTS

| | | | | |
|---|---|---|---|---|
| 5,257,369 A | 10/1993 | Skeen et al. | ............... | 395/650 |
| 5,530,852 A | 6/1996 | Meske, Jr. et al. | ........... | 395/600 |
| 5,537,526 A | 7/1996 | Anderson et al. | ........... | 395/148 |
| 5,737,619 A | 4/1998 | Judson | ........................ | 395/761 |
| 5,748,186 A | 5/1998 | Raman | ........................ | 345/302 |
| 5,754,173 A | 5/1998 | Hiura et al. | ................... | 345/333 |
| 5,774,660 A | 6/1998 | Brendel et al. | .......... | 395/200.31 |
| 5,774,668 A | 6/1998 | Choquier et al. | ....... | 395/200.53 |
| 5,793,972 A | 8/1998 | Shane | ................... | 395/200.49 |
| 5,850,520 A | 12/1998 | Griebenow et al. | .... | 395/200.36 |
| 5,860,074 A | 1/1999 | Rowe et al. | ................. | 707/526 |
| 5,878,224 A | 3/1999 | Smith | .................... | 395/200.54 |
| 5,918,013 A | 6/1999 | Mighdoll et al. | ........ | 395/200.47 |
| 5,953,392 A | 9/1999 | Rhie et al. | ............... | 379/88.13 |
| 5,987,256 A | 11/1999 | Wu et al. | ..................... | 395/707 |
| 5,987,504 A | 11/1999 | Toga | .......................... | 709/206 |
| 5,996,022 A | 11/1999 | Krueger et al. | .............. | 709/247 |
| 6,055,564 A * | 4/2000 | Phaal | .......................... | 709/207 |
| 6,094,671 A | 7/2000 | Chase et al. | ................ | 709/201 |

(Continued)

FOREIGN PATENT DOCUMENTS

CN 1209208 2/1999

(Continued)

OTHER PUBLICATIONS

International PCT/EP2005/050797 Search Report dated Aug. 22, 2005.

(Continued)

*Primary Examiner*—John B Strege
(74) *Attorney, Agent, or Firm*—Matthew W. Baca; Williams, Morgan & Amerson

(57) ABSTRACT

A method and an apparatus for providing a portion of an electronic mail message having a reduced resolution are presented. The method includes determining whether it is desirable to provide less than all of an electronic mail message, selecting a portion of the electronic mail message, and reducing a resolution of the selected portion of the electronic mail message. The method also includes providing the portion of the electronic mail message with reduced resolution.

1 Claim, 7 Drawing Sheets

U.S. PATENT DOCUMENTS

| | | | |
|---|---|---|---|
| 6,098,180 A | 8/2000 | Kobata et al. | 714/18 |
| 6,115,482 A | 9/2000 | Sears et al. | 382/114 |
| 6,134,584 A | 10/2000 | Chang et al. | 709/219 |
| 6,148,330 A | 11/2000 | Puri et al. | 709/217 |
| 6,154,769 A | 11/2000 | Cherkasova et al. | 709/207 |
| 6,161,126 A | 12/2000 | Wies et al. | 709/203 |
| 6,243,761 B1 | 6/2001 | Mogul et al. | 709/246 |
| 6,256,666 B1 | 7/2001 | Singhal | 709/217 |
| 6,256,672 B1 | 7/2001 | Redpath | 709/232 |
| 6,275,848 B1 | 8/2001 | Arnold | 709/206 |
| 6,298,358 B1 * | 10/2001 | Gormish | 715/236 |
| 6,311,210 B1 | 10/2001 | Foladare et al. | 709/206 |
| 6,311,215 B1 | 10/2001 | Bakshi et al. | 709/221 |
| 6,345,298 B1 | 2/2002 | Moriya | 709/228 |
| 6,381,709 B1 | 4/2002 | Casagrande et al. | 714/18 |
| 6,401,132 B1 | 6/2002 | Bellwood et al. | 709/246 |
| 6,405,240 B1 | 6/2002 | Tsubone et al. | 709/203 |
| 6,421,733 B1 | 7/2002 | Tso et al. | 709/246 |
| 6,430,624 B1 | 8/2002 | Jamtgaard et al. | 709/246 |
| 6,438,592 B1 | 8/2002 | Killian | 709/224 |
| 6,449,637 B1 | 9/2002 | Toga | 709/206 |
| 6,460,074 B1 | 10/2002 | Fishkin | 709/206 |
| 6,510,469 B1 * | 1/2003 | Starnes et al. | 709/247 |
| 6,535,896 B2 | 3/2003 | Britton et al. | 707/523 |
| 6,563,913 B1 * | 5/2003 | Kaghazian | 379/93.24 |
| 2002/0016818 A1 | 2/2002 | Kirani et al. | |
| 2002/0112010 A1 | 8/2002 | Soroker et al. | |
| 2002/0138586 A1 | 9/2002 | Paleiov et al. | |
| 2003/0009528 A1 | 1/2003 | Sharif et al. | |
| 2003/0028647 A1 | 2/2003 | Grosu | |
| 2003/0055907 A1 | 3/2003 | Stiers | |
| 2003/0095550 A1 | 5/2003 | Lewis et al. | |
| 2003/0163515 A1 | 8/2003 | Loveland et al. | |
| 2003/0163531 A1 | 8/2003 | Nakajima | |
| 2004/0066419 A1 * | 4/2004 | Pyhalammi | 345/864 |
| 2005/0086306 A1 * | 4/2005 | Lemke | 709/206 |

FOREIGN PATENT DOCUMENTS

| | | |
|---|---|---|
| EP | 0 947 931 A2 | 10/1999 |
| EP | 0 967 559 A1 | 12/1999 |
| EP | 1 079 311 A2 | 2/2001 |
| EP | 1 126 380 A1 | 8/2001 |
| WO | 99/57657 | 11/1999 |
| WO | 03/010634 A2 | 2/2003 |
| WO | 03/036492 A1 | 5/2003 |

OTHER PUBLICATIONS

Hadjadj et al., "*Making the Internet Accessible to the Visually Handicapped,*" RESNA Jun. 1998, cover page and pp. 269-271.

Kieninger et al., "*Hyperbraille—A Hypertext System for the Blind,*" ASSETS '94, Oct. 1994.

International Business Machines Corporation; Research Disclosure entitled *Electronic Mail Attachment Selector*, Jan. 2002, 2 pages.

Mazzocchi, *eXtensible Server Pages (XSP) Layer 1*, Jun. 11, 1999, http://xml.coverpages.org/WD-xsp-19990611.html.

Smith, et al.; U.S. Appl. No. 09/292,191 entitled "*An Apparatus for Scheduled Service of Network Requests and a Method Therefor,*" filed Apr. 15, 1999, 28 pages.

Dutta; U.S. Appl. No. 09/428,409 entitled "*Delayed Delivery of Web Pages Via E-Mail or Push Techniques From an Overloaded or Partially Functional Web Server,*" filed Oct. 28, 1999, 38 pages.

Dutta, et al.; U.S. Appl. No. 09/458,646 entitled "*Electronic Document Delivery System Employing Distributed Documents Object Model (DOM) Based Transcoding,*" filed Dec. 9, 1999, 52, pages.

Dutta, U.S. Appl. No. 09/543,310 entitled *Sending Full-Content Data to a Second Data Processing System Whil Viewing Reduced-Content Data on a First Data Processing System*, filed Apr. 5, 2000, 35 pages.

Ban; U.S. Appl. No. 10/660,008 entitled "*Method and Apparatus for Fast Communication with Symbol Linked Object Based System,*" filed Sep. 11, 2003, 14 pages.

Co-Pending U.S. Appl. No. 10/788,022, Providing A Portion of An Electronic Mail Message Based Upon A Transfer Rate, A Message Size, and A File Format.

Co-Pending U.S. Appl. No. 10/787,982, Providing Notification of An Undelivered Portion of An Electronic Mail Message Based Upon A Scheduled Time.

Co-Pending U.S. Appl. No. 10/788,999, Providing A portion of An Electronic Mail Message Based Upon Digital Rights.

Co-Pending U.S. Appl. No. 10/787,998, Providing A Portion Of An Electronic Mail Message Based Upon A Transfer Rate And A Message Size.

International Search Report dated Jun. 17, 2005.

Office Action Dated Aug. 24, 2007 for U.S. Appl. No. 10/788,022.

Final Office Action Dated Feb. 6, 2008 for U.S. Appl. No. 10/788,022.

Office Action Dated Nov. 28, 2007 for U.S. Appl. No. 10/788,999.

Final Office Action Dated Apr. 29, 2008 for U.S. Appl. No. 10/788,999.

Office Action Dated Apr. 18, 2008 for U.S. Appl. No. 10/787,998.

Office Action Dated Jul. 23, 2008 for U.S. Appl. No. 10/787,982.

* cited by examiner

PROVIDING A PORTION OF AN ELECTRONIC MAIL MESSAGE AT A REDUCED RESOLUTION

BACKGROUND OF THE INVENTION

1. Field of the Invention

This invention relates generally to electronic mail messaging, and, more particularly, to providing a portion of an electronic mail message at a reduced resolution.

2. Description of the Related Art

Electronic mail has become a central feature of modern life and users have come to expect to receive electronic mail messages at any time and in virtually any place. For example, during the course of one day of travel, a user may receive electronic mail messages at a home desktop computer in the early morning, an office desktop computer in midmorning, via a cell phone or personal digital assistant in a taxi on the way to the airport, on a laptop computer via a wireless local area network while waiting in the airport lounge, via an in-flight telephone on the airplane, and in a hotel room via a high-speed Internet connection provided by the hotel at the end of the day.

Thus, depending on the circumstances, electronic mail messages may be transmitted and/or received by a wide variety of devices at any given time. In addition to the aforementioned end-user devices, such as desktop computers, laptop computers, cell phones, personal digital assistants, and the like, electronic mail messages typically also pass through a variety of network servers, network switches, hubs, routers, transmission lines, wireless transmission media, modems, interface cards, and the like. The transfer rates of these devices and/or media can vary by many orders of magnitude. For example, a laptop computer's modem may be limited to a transfer rate of 56K bits per second, a cable modem may easily provide data at a transfer rate of 1-2 megabits per second, and a T-3 connection may provide data at a transfer rate as high as 40 megabits per second.

The complexity and size of electronic mail messages has increased roughly in proportion with the available transfer rate. Early electronic mail message systems relied upon comparatively slow modems and thus these electronic mail messages were typically limited to short ASCII text documents. Modern electronic mail messaging systems, on the other hand, may utilize high-speed connections to transmit documents containing complex formatting, audio, graphics, video, and the like. For example, a user may send and/or receive an electronic mail messages with a PowerPoint attachment including formatted text, images, and animations. For another example, a user with the appropriate licenses may send and/or receive a feature length movie as an electronic mail message. The size of these files may easily exceed several megabytes, and users may expect to transmit even larger files in the future.

Despite the advantages of using high-speed connections to transmit large information-rich electronic mail messages, the same messages can become problematic when they must be transmitted by a lower speed connection. For example, a user reading electronic mail messages on a laptop computer connected to the Internet via a 14.4K dial-up modem may have to wait an inordinate amount of time for a large electronic mail message to be downloaded through the modem. As another example, a user writing electronic messages on the laptop computer connected to the Internet via a 14.4 KB dial-up modem may want to attach a large document to an electronic mail message, but may have to wait an unreasonable amount of time for the electronic mail message to be uploaded through the modem. In addition, bottlenecks, heavy traffic, device malfunctions, severed transmission lines, geomagnetic storms, and the like can dramatically, and often unpredictably, decrease the transfer rate of even the highest speed networks. Consequently, the user may have to wait an unreasonable amount of time to receive any indication of the content of the electronic mail message, including any attached files.

Moreover, it may be difficult for the user to determine what information may be contained in the electronic mail message without receiving the entire message. For example, conventional electronic mail messaging systems are not typically able to play audio files in electronic mail message attachments unless the entire message has been received by the user. For another example, conventional electronic mail messaging systems are not typically able to display graphics files, such as films and/or animations, in electronic mail message attachments unless the entire message has been received by the user. This problem is exacerbated by the virtually unlimited number of formats, such as Moving Picture Experts Group (MPEG), Joint Photographic Experts Group (JPEG), Graphics Interchange Format (GIF), Portable Network Graphics (PNG), Video for Windows, Apple Quicktime®, AVI, and the like, available for the files that may be included in the attachments.

The present invention is directed to addressing, or at least reducing, the effects of, one or more of the problems set forth above.

SUMMARY OF THE INVENTION

In one aspect of the instant invention, a method of providing a portion of an electronic mail message having a reduced resolution is presented. The method includes determining whether it is desirable to provide less than all of an electronic mail message, selecting a portion of the electronic mail message, and reducing a resolution of the selected portion of the electronic mail message. The method also includes providing the portion of the electronic mail message with reduced resolution. An apparatus for implementing the method, as well as an article comprising one or more machine-readable storage media containing instructions that when executed enable a processor to carry out the method, are also provided.

BRIEF DESCRIPTION OF THE DRAWINGS

The invention may be understood by reference to the following description taken in conjunction with the accompanying drawings, in which like reference numerals identify like elements, and in which.

Figure 1:
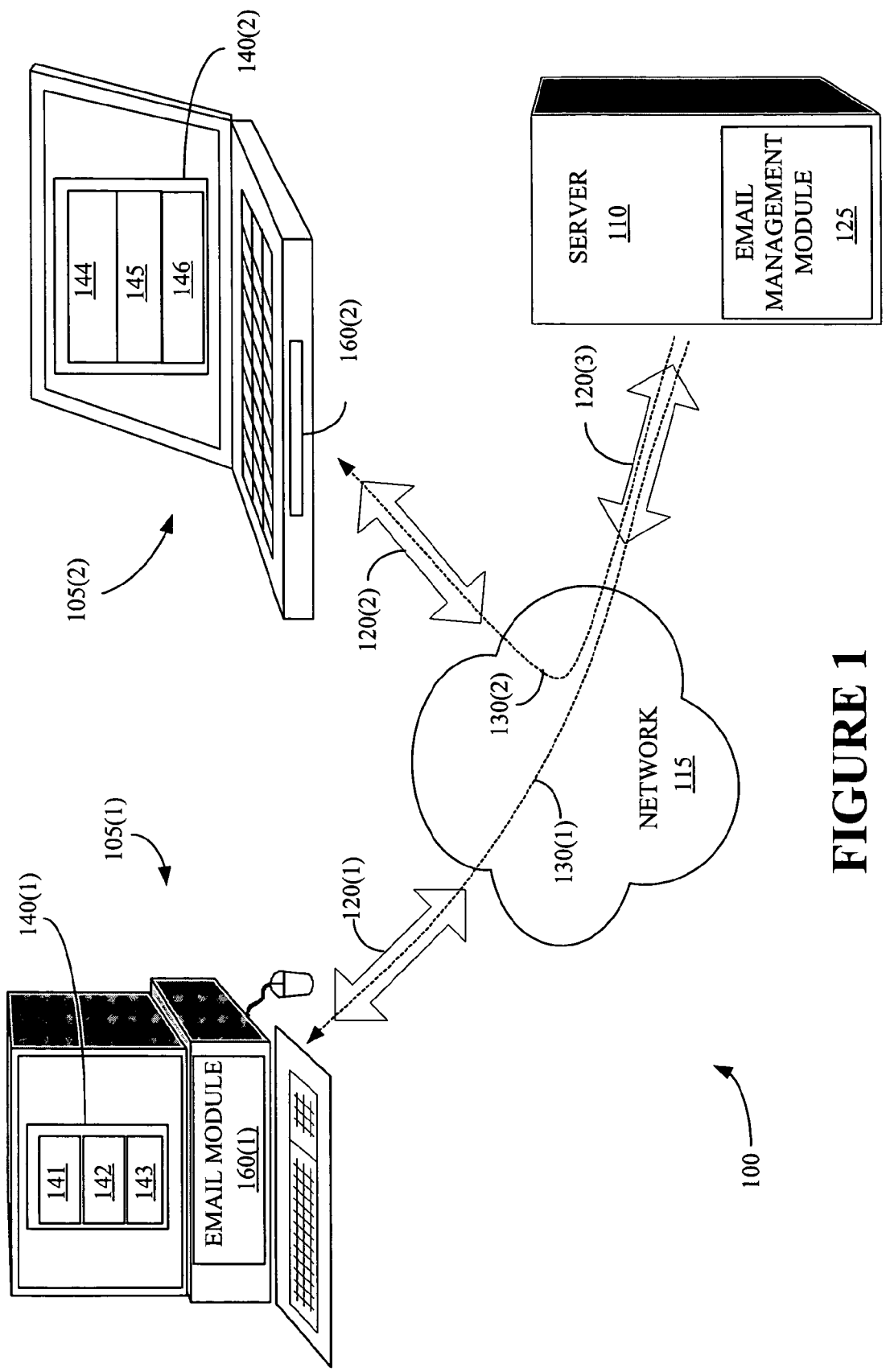
FIG. 1 illustrates a system for practicing one or more embodiments of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The words and phrases used herein should be understood and interpreted to have a meaning consistent with the understanding of those words and phrases by those skilled in the relevant art. No special definition of a term or phrase, i.e. a definition that is different from the ordinary and customary meaning as understood by those skilled in the art, is intended to be implied by consistent usage of the term or phrase herein. To the extent that a term or phrase is intended to have a special meaning, i.e. a meaning other than that understood by skilled artisans, such a special definition will be expressly set forth in the specification in a definitional manner that directly and unequivocally provides the special definition for the term or phrase.

As will be described in detail below, the present invention provides for intelligent use of the bandwidth available for transmitting electronic mail messages. For example, in one embodiment of the present invention, an e-mail server may autonomously decide whether an e-mail should be uploaded and/or downloaded based upon environmental factors such as a connection speed of a local system to a remote server. In another embodiment, a user may decide, manually or using an automated process based upon selected user preferences, what portions of an e-mail are sent and/or received. In particular, a downcasted portion of one or more attachments having a reduced resolution may be sent and/or received. The user may also be provided with notifications of what choices are available and what actions have been taken.

FIG. 1 illustrates a system 100 for practicing one or more embodiments of the present invention. In particular, FIG. 1 conceptually illustrates an embodiment that includes a plurality of processor-based devices 105(1-2) coupled to a server 110 by a network 115. In the illustrated embodiment, the processor-based device 105(1) is a desktop computer and the processor-based device 105(2) is a laptop computer, although in other embodiments, these processor-based devices 105(1-2) may be any desirable type of computer, personal digital assistant, cellular telephone, and the like.

The server 110, in one embodiment, may be one form of a processor-based device that can be accessed over the network 115. In accordance with one embodiment of the present invention, and as discussed below, the server 110, if desired, provides a less than the entire electronic mail message to a remote user. In one embodiment, the server 110 may be capable of performing tasks such as receiving, queuing, storing, and/or distributing e-mails to one or more users. Although not so limited, in one embodiment, one or more of the described embodiments of the present invention can be implemented within a conventional e-mail server, such as a Microsoft® Exchange Server. In the interest of clarity, the potential functionality of the server 110 not related to the present invention will not be described in further detail, as these tools and/or features are well known to persons of ordinary skill in the art.

In the embodiment illustrated in FIG. 1, the processor-based devices 105(1-2) and the server 110 are communicatively coupled to the network 115 over one or more communications links 120(1-3). In various alternative embodiments, the links 120(1-3) may be one or more of infrared links, wireless local area network (LAN) links, wired LAN connections such as Ethernet connections, cellular network links, circuit board traces, wires, cables, radiofrequency links, satellite links, and the like. Moreover, any desirable protocol may be used for communications between the processor-based devices 105(1-2) and the server 110 via the network 115. For example, a transmission control protocol/Internet protocol (TCP/IP), a user datagram protocol/Internet protocol (UDP/IP), a file transfer protocol or trivial file transfer protocol (FTP/TFTP), and the like may be used.

Figure 2:
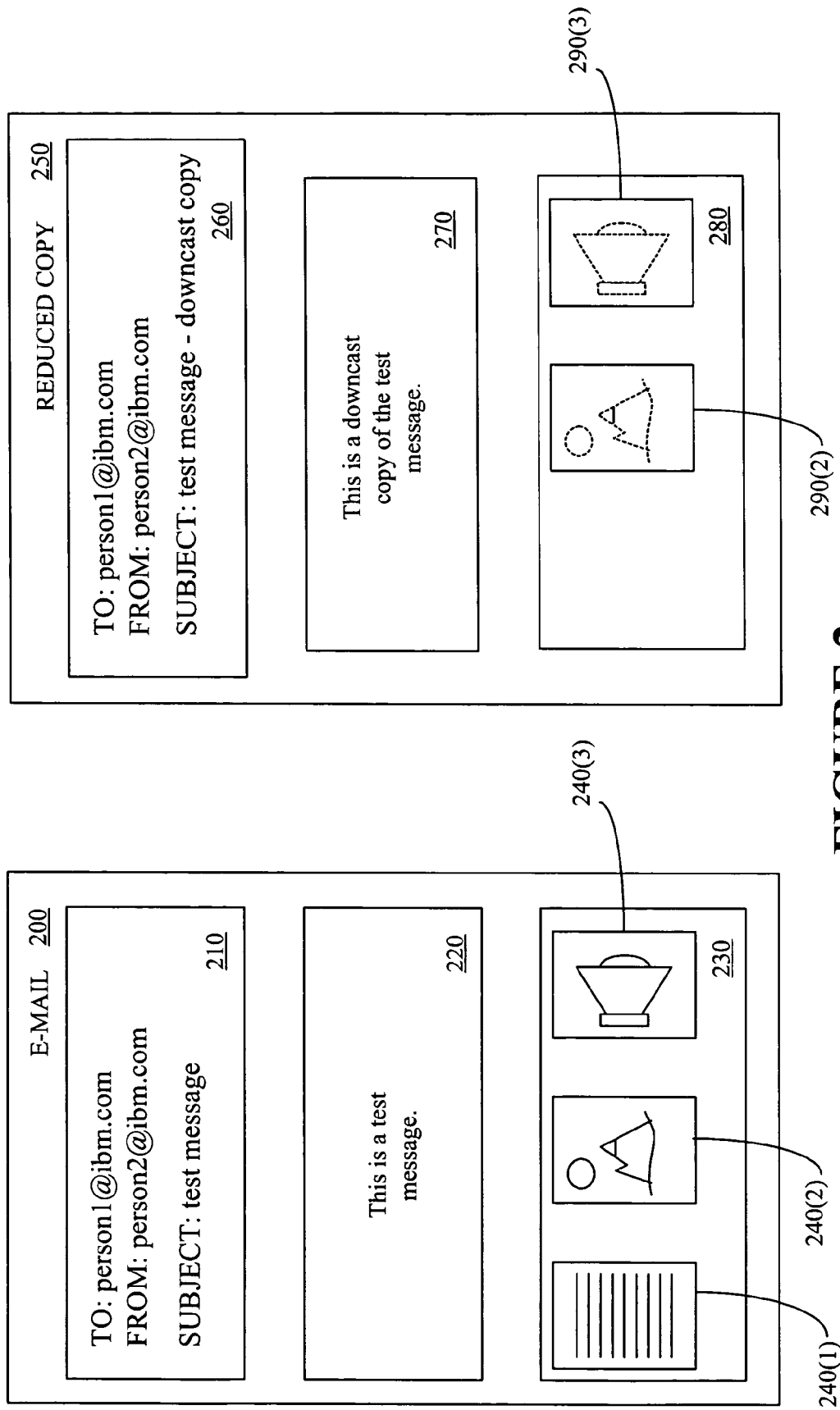
FIG. 2 shows one embodiment of an e-mail that may be stored by an e-mail management module, in accordance with one embodiment of the present invention.

In the embodiment illustrated in FIG. 1, the server 110 includes an e-mail management module 125, which may process (e.g. receive, queue, store, and/or deliver) one or more one or more electronic mail messages, hereinafter referred to as e-mails, in accordance with common usage in the art. One form of an e-mail 200 that may be processed by the e-mail management module 125 is shown in FIG. 2. In the embodiment illustrated in FIG. 2, the e-mail 200 includes a header 210, a body 220, and one or more attachments 230. The header 210 generally includes information indicative of the recipients of the e-mail (i.e. person1@ibm.com), the sender (i.e. person2@ibm.com), and the subject of the e-mail 200 (i.e. test message). The body 220 generally includes the message being conveyed. For example, in the e-mail 200, the body includes a text string, "This is a test message."

The e-mail message 200 shown in FIG. 2 also includes attachments 240(1-3) that, in the illustrated embodiment, include a text document 240(1), a graphics file 240(2), and an audio file 240(3). However, persons of ordinary skill in the art will appreciate that any desirable number of files, as well as any desirable type and/or format of file, may be attached to the e-mail 200. Additionally, it should be appreciated that the e-mail 200 illustrated in FIG. 2 is exemplary in nature, and that in other embodiments it may include more, fewer, or different elements. For example, the e-mail 200 may only include a header 210 and a body 220. As another example, the e-mail 200 may also include routing information that may be used to direct the e-mail 200 to a desired destination.

The attachments 240(1-3) may be created using in any of a variety of formats. For example, the text document 240(1) may be created using Microsoft Word®, Acrobat Distiller®, Power Point®, Lotus WordPro®, or a similar document creation or publication tool. For another example, the graphics file 240(2) and/or the audio file 240(3) may be formed in various proprietary and non-proprietary formats including, but not limited to, one of the Moving Picture Experts Group (MPEG) formats, a Joint Photographic Experts Group (JPEG) format, Graphics Interchange Format (GIF) format, Portable Network Graphics (PNG) format, Video for Windows® format, AVI format, and Apple Quicktime® format.

The format of the attachments 240(1-3) may be indicated in a variety of manners. In one embodiment, the file name extension may indicate the file format. For example, files in the MP-3 format may be indicated by the file name extension "mp3." For another example, files in the JPEG format may be indicated by the file name extension "jpg." Alternatively, the format of the attachments 240(1-3) may be indicated by one or more characters, control characters, strings, and the like, which may be inserted into the attachments 240(1-3). The format of the attachments 240(1-3) may then be determined by parsing a portion of the attachment 240(1-3).

Referring back to FIG. 1, the e-mail management module 125 on the server 110 provides the e-mail 200, or a selected portion, to one or more designated recipients, which, for illustrative purposes, are assumed to be the users of the processor-based systems 105(1-2). Thus, in this illustrative example, the e-mail management module 125 provides at least the selected portion of the e-mail 200 to the processor-based devices 105(1-2). However, persons skilled in the art will appreciate that, in alternative embodiments, any number of users of any desirable processor-based systems may be designated as the recipients and may receive portions of the e-mail 200 provided by the e-mail management module 125. The portion of the e-mail 200 transmitted to the user of each processor-based device 105(1) and 105(2) is hereinafter designated in FIG. 1 by reference numbers 140(1) and 140(2), respectively.

The e-mail management module 125 may provide the e-mail 200 via a variety of communication paths 130(1-2). In the illustrated embodiment, the e-mail management module 125 may transmit a selected portion of the e-mail 200 (designated by reference number 140(1)) to the processor-based device 105(1) along the communication path 130(1), which may include the link 120(3), the network 115, and the link 120(1). The e-mail management module 125 may also transmit a selected portion of the e-mail 200 (designated by reference number 140(2)) to the processor-based device 105(2) along the communication path 130(2), which may include the link 120(3), the network 115, and the link 120(2). Those skilled in the art will appreciate that communications paths 130(1-2) may include one or more intermediate gateways (not shown), routers (not shown), and the like.

As explained above, the data transfer rate along the communication paths 130(1-2) may vary by many orders of magnitude. For example, the communication path 130(1) may consist of a dedicated T-3 connection that may provide data at a transfer rate as high as 40 megabits per second. Accordingly, even if the attachments 240(1-3) attached to the e-mail 200 are large, e.g. 100 MB, the total time required to transfer the copy 140(1) may remain comparatively low, e.g. a few seconds in the case of the 100 MB attachments 240(1-3). In contrast, the communication path 130(2) may include a dial-up connection, such as the link 120(2), which may transfer data at a much lower rate. Thus, a user may have to wait several hours for the 100 MB attachments 240(1-3) to be transferred via the communication path 130(2).

The long transfer time may inconvenience the user, particularly if the user does not necessarily wish to see all of the e-mail 200 and/or the attachments 240(1-3). For example, in the case of large-size attachments, such as audio, video, image, and graphic files, a user may not want to have to download the entire e-mail to identify the nature of the e-mail or it contents. Thus, in accordance with one embodiment of the present invention embodiment, the server 110 provides a user with a lower resolution version of one or more of the e-mail attachments 240(1-3). For example, if the attachment is an audio file, such as attachment 240(2), which may include an MP3 or WAV file, the user may only need to hear a low resolution clip of the song before deciding whether or not to receive the complete attachment 240(2). In another example, if the attachment is a video file, such as attachment 240(3), which may be a Quicktime® file, the user may only need to see a reduced resolution clip of the movie before deciding whether or not to receive the complete attachment 240(3). In one embodiment, one or more portions of the attachments 240(1-3) may be assigned a higher priority by, e.g. a user, than other portions of the attachments 240(1-3). In this embodiment, the user may want to see only the highest priority portions of the attachments 240(1-3).

In order to reduce the potential inconvenience to the user and increase the efficiency of the system 100, the e-mail management module 125, in one embodiment, may only transfer a portion of the e-mail 200 along one or more of the communication paths 130(1-2). In particular, the e-mail management module 125 may determine a format of at least a portion of the e-mail 200 (including the attachments 240(1-3)), select a portion of the e-mail 200 to transmit, downcast the selected portion of the e-mail 200, and transmit the downcasted portion of the e-mail 200 along one or more of the communication paths 130(1-2). For example, as will be discussed in detail below, the e-mail management module 125 may estimate a data transfer rate for the communication paths 130(1-2) and a size of the e-mail 200. In one embodiment, the estimated data transfer rate and the estimated size of the e-mail 200 may be used to estimate the time required to transfer the e-mail 200 along the communication paths 130 (1-2).

The e-mail management module 125 may also determine a threshold time, such as a user's maximum preferred time to transfer the e-mail 200, and compare the determined threshold to the estimated e-mail transfer time. For example, the user may select a maximum preferred transfer time of approximately one minute. For another example, the user may select a maximum preferred transfer time of approximately zero minutes to force the e-mail management module to provide a reduced copy 140(2) of all e-mails 200. Alternatively, the threshold time may be a default time.

If the estimated e-mail transfer time is substantially less than the predetermined threshold time, the e-mail management module 125 may transmit substantially all of the e-mail 200. For example, the processor-based device 105(1) may receive the complete copy 140(1) of the e-mail message 200, including a header 141, a body 142, and one or more attachments 143. However, if the estimated e-mail transfer time is substantially more than the predetermined threshold time, and it is not desirable to transmit the entire e-mail 200, the e-mail management module 125 may transmit a portion of the e-mail 200. For example, the processor-based device 105(2) may receive the reduced copy 140(2) of the e-mail message 200, including a header 144, a body 145, and a selected portion of one or more attachments 146.

FIG. 2 shows one embodiment of a reduced copy 250, which includes a header 260 and a body 270. The header 260 includes information indicative of the recipients of the e-mail (i.e. person1@ibm.com), the sender (i.e. person2@ibm.com), and the subject of the e-mail 200 (i.e. test message—downcast copy). The body 270 includes a text string, "This is a downcast copy of the test message." In addition, the body 270 may include other information, such as the estimated size of the attachments 240(1-3), the estimated transfer time for the entire e-mail 200 and/or for the attachments 240(1-3), and the like. In one embodiment, the reduced copy 250 may include a selected portion 280 representative of the contents of one or more of the attachments 240(1-3). In the illustrated embodiment, the selected portion 280 includes a reduced resolution, or downcast, version 290(2) of the graphics attachment 240(2) and a reduced resolution, or downcast, version 290(3) of the audio attachment 240(3). Although not shown in the FIG. 2, the selected portion 280 may include other information, such as portions of the text attachment 240(1).

Referring back to FIG. 1, the e-mail management module 125 may, in alternative embodiments, "trickle download" the e-mail 200, i.e. successively download portions of the e-mail 200 in the background during one or more sessions, to the processor-based device 105(2). In one embodiment, the e-mail management module 125 may notify the user to indicate what choices are available, e.g. downloading the reduced copy 140(2) or trickle downloading the e-mail 200, and/or what actions have taken place. The e-mail management module 125 may also queue and/or store the e-mail 200. For example, if the reduced copy 140(2) has been transmitted to the processor-based device 105(2), the e-mail 200 may be queued and/or stored until a higher speed connection is available. In one embodiment, the e-mail management module 125 may periodically provide reminders, such as a pop-up dialog box, asking the user to connect to a high-speed connection and/or asking if the user would like to download the e-mail 200.

In one embodiment, the processor-based devices 105(1-2) may include e-mail modules 160(1-2), which may carry out a portion of the aforementioned processes or additional processes. For example, the e-mail modules 160(1-2) may allow a user to set up preferences as to how electronic mail messages are to be handled. When the user is ready to process electronic mail messages, the e-mail modules 160(1-2) may send a message to the server 110, such as a POP3 or IMAP server 110, which may cause various flags to be set based upon the user preferences. Electronic mail messages may then be processed in accordance with the user preferences indicated by the flags, as will be discussed in detail below. The modules 125, 160(1-2) illustrated in FIG. 1 are implemented in software, although in other implementations the modules 125, 160(1-2) may also be implemented in hardware or a combination of hardware and software.

Figure 3:
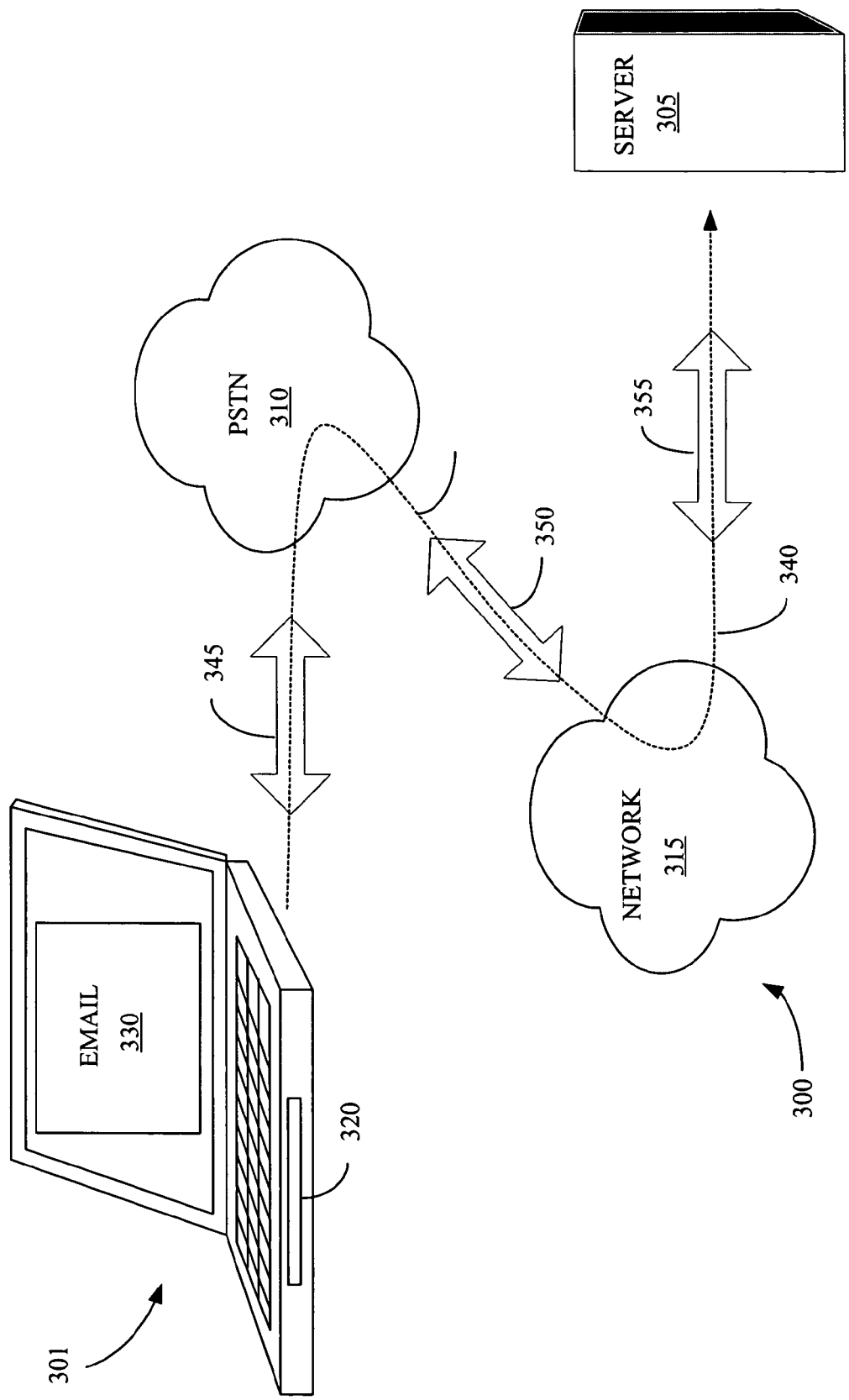
FIG. 3 conceptually illustrates one alternative embodiment of a system that may implement one or more embodiments of the present invention.

FIG. 3 conceptually illustrates a system 300 that may implement one or more alternative embodiments of the present invention. In FIG. 3, a processor-based device 301 is communicatively coupled to a server 305 by a public switched telephone network (PSTN) 310 and a network 315. Thus, the transmission of e-mails from the processor-based device 301 to the server 305 may be implemented in the alternative embodiment shown in FIG. 3. In the illustrated embodiment, the processor-based device 301 includes an e-mail management module 320 that may provide a copy of an e-mail 330 to the server 305. For example, in the illustrated embodiment, the e-mail management module 320 may transmit at least a portion of the e-mail 330 having a reduced resolution, e.g. a downcasted version of at least a portion of the e-mail 330, to the server 310 along the communication path 340, which may include the link 345, the public switched telephone network 310, the link 350, the network 315, and the link 355.

As discussed above, the data transfer rate along the communication path 340 may vary by many orders of magnitude. For example, if the processor-based device 301 is linked to the public switched telephone network (PSTN) 310 via a 14.4 KB modem (not shown), it may not be desirable to transmit a 100 MB attachment (not shown) to the server 305. Thus, the e-mail management module 320 may only transmit a portion of the e-mail 330 along the communication path 340. Alternatively, the e-mail 330 may be trickle uploaded to the server 305 along the communication path 340. In one embodiment, the user may assign a priority level to one or more portions of the e-mail 330, which may be used to select a portion of the e-mail 330 to transmit, as will be discussed in detail below.

In one embodiment, after transmitting the portion of the e-mail 330 having a reduced resolution along the communication path 340, the e-mail management module 320 may queue and/or store the e-mail 330 until a faster connection becomes available. For example, a user may later connect the processor-based device 301 to the network 315 via a higher-speed connection, such as an Ethernet, and then the e-mail management module 320 may transmit the e-mail 330, or an additional portion thereof, using the higher speed connection. In one embodiment, the e-mail management module 320 may periodically provide reminders, such as a pop-up dialog box, asking the user to connect to a high-speed connection and/or asking if the user would like to upload the e-mail 330.

Figure 4:
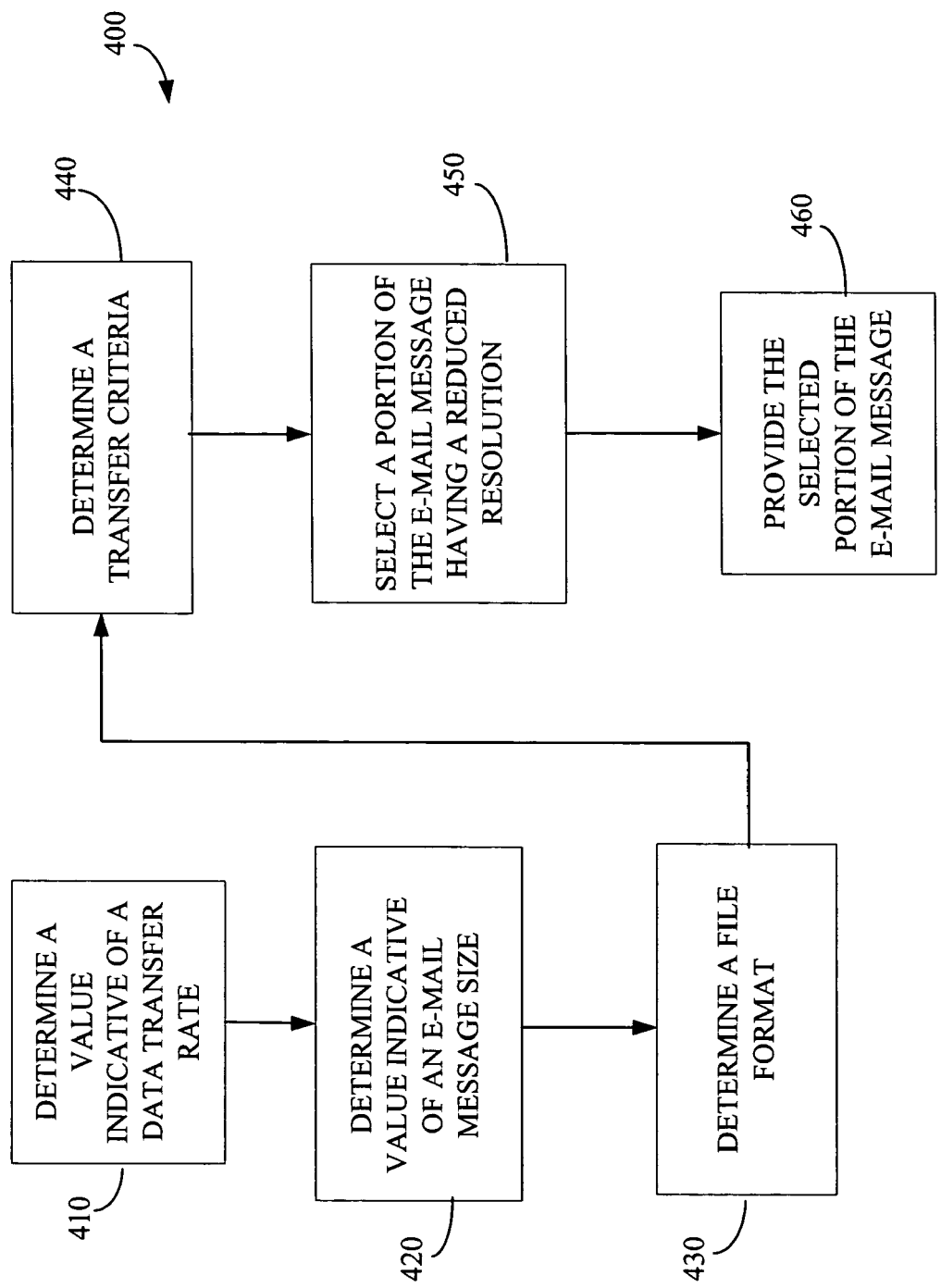
FIG. 4 illustrates one embodiment of a method for providing a portion of an electronic mail message, in accordance with one embodiment of the present invention.

FIG. 4 illustrates one embodiment of the method of 400 for providing a portion of an electronic mail message having a reduced resolution based upon a data transfer rate, a size of the electronic mail message, and a threshold time. In the illustrated embodiment, a value indicative of, or associated with, a data transfer rate is determined (at 410). For example, an e-mail management module, such as the e-mail management modules 125, 320 and/or the e-mail modules 160(1-2), may determine (at 410) an average data transfer rate using one or more data packets received within a time period. Alternatively, the e-mail management module may determine (at 410) a data transfer rate using a device profile. For example, the e-mail management module may determine (at 410) that a 14.4 KB modem is being used to transmit data and, thus, the e-mail management module may determine (at 410) that the data transfer rate may not exceed approximately 14.4 KB. Persons of ordinary skill in the art should appreciate that the aforementioned techniques for determining (at 410) the data transfer rate are exemplary and not intended to limit the present invention.

A value indicative of, or associated with, a size of an electronic mail message is also determined (at 420). In one embodiment, the e-mail management module may determine (at 420) the size of the electronic mail message by determining (at 420) the number of bits in the electronic mail message. Alternatively, the size of the electronic mail message may be determined (at 420) using information that may be transmitted with the electronic mail message. In one alternative embodiment, the e-mail management module may determine (at 420) the value indicative of the size of the electronic mail message by determining (at 420) the number of bits in at least one file attached to the electronic mail message.

A format of at least one file associated with an electronic mail message is determined (at 430). In one embodiment, the e-mail management modules 125, 320 and/or the e-mail modules 160(1-2), may determine (at 430) the format of at least one file associated with the electronic mail message. For example, the e-mail management modules 125, 320 and/or the e-mail modules 160(1-2), may determine (at 430) that the format of at least one file is MPEG, JPEG, GIF, PNG, Video for Windows®, Apple Quicktime®, AVI, and the like. In various alternative embodiments, the e-mail management modules 125, 320 and/or the e-mail modules 160(1-2), may determine (at 430) the file format using a file-type-specific plug-in, transcoder, splitter, and the like. In one embodiment, the e-mail management modules 125, 320 and/or the e-mail modules 160(1-2), may determine (at 430) the format of the at least one file using a file name extension.

A mail transfer criteria is also determined (at 440). In the previously discussed embodiments of the present invention, the mail transfer criteria has been associated with a mail transfer threshold time, such as a user's preferred maximum transfer time or a default threshold time. In these embodiments, the mail transfer criteria is determined (at 440) by determining the threshold time using an indication of the user's preferred maximum transfer time, such as a user profile, or an indication of the default threshold time. However, the potential mail transfer criteria are not limited to the threshold time. In alternative embodiments, the mail transfer criteria may include various user preferences such as a maximum size of an attachment, a minimum average data transfer rate, a time of day, a priority level, and the like.

Figure 5:
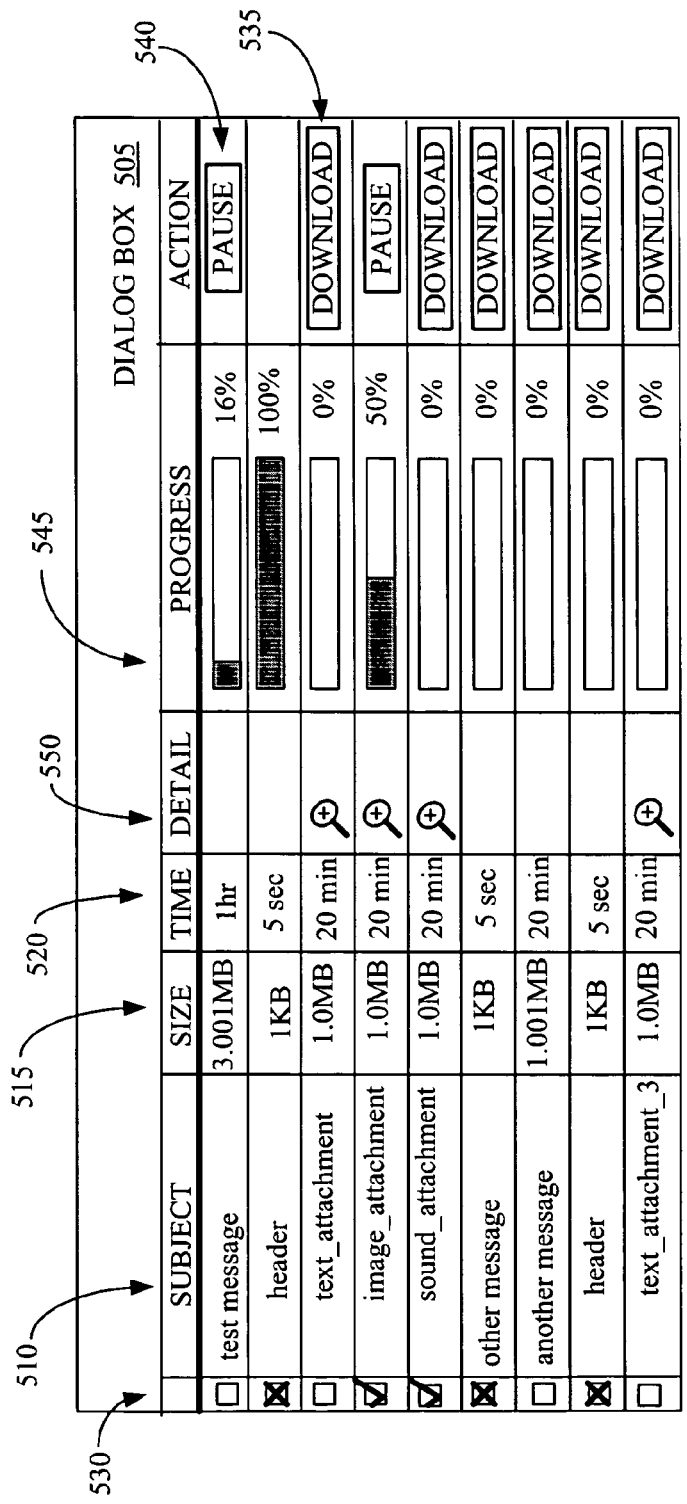
FIG. 5A shows one exemplary embodiment of a user profile, in accordance with one embodiment of the present invention.
FIG. 5B shows one exemplary embodiment of a dialog box, in accordance with one embodiment of the present invention.

In one embodiment, illustrated in FIG. 5A, a user may provide a user profile 500 indicating the user preferences that may be used to determine (at 440) the mail transfer criteria. For example, the user may indicate, via the user profile 500, that e-mails that can be downloaded within a preselected time (e.g., in 10 minutes or less) should be downloaded. Alternatively, the user profile 500 may indicate that e-mails smaller than a preselected size (e.g., about 250 KB or less) should be downloaded and/or that e-mails that can be downloaded at an average rate of greater than a preselected threshold (e.g., about 300 Kbps) should be downloaded. The user profile 500 may also indicate that e-mails having a high priority level should be downloaded and that the user would like to be prompted before uploading and/or downloading the portions of the e-mails. In one embodiment, some or all of the information stored in the user profile 500 may be manually provided by the user when the user connects to access the stored e-mails, or, alternatively, the information, if pre-stored, may be made available to a device (e.g., the server 110) desiring access to the stored information. Depending on the implementation, the user profile 500 may be pre-stored at any desirable location, including the processor-based devices 105 (1-2), 301, the servers 110, 305, and the like.

For illustrative purposes, it is assumed that the user profile 500 is stored in a convenient location, and, if desired, can be accessed by the appropriate device and/or module, including the e-mail modules 160(1-2), 320, the e-mail management module 125, and the like. In one embodiment, when the user is ready to process one or more of the received e-mails, a message indicative of the information included in the user profile 500 may be sent to a server, such as the servers 110, 305, which may set flags based upon the user preferences. For example, the flags may indicate that the servers 110, 305 should queue e-mails that are to be sent and/or received via a high speed connection, should not download attachments larger that the Maximum Download Size indicated in the user profile 500, should prompt before uploading and/or downloading attachments, and the like.

In some embodiments, flags may also be set on the processor-based-devices 105(1-2), 301 and other devices (not shown) such as third-party proxy servers, e.g. mail servers, and the like. However, persons of ordinary skill in the art should appreciate that the other devices, such as proxy servers, may have additional rules for handling e-mails. For example, a mail server may operate according to a rule that limits the size and/or number of copies of an e-mail that may be sent. The device rules may, in some instances, override the preferences and/or flags that may be determined according to some embodiments of the present invention. For example, the mail server may decline to send copies of a 50 MB e-mail to 100 users, regardless of the preferences that may be indicated by the user profile 500 and/or the flags that may be set on the processor-based-devices 105(1-2), 301 and other devices.

A portion of the electronic mail message is then selected (at 450) based upon the determined data transfer rate, the determined size of the electronic message, the file format, and the mail transfer criteria. In one embodiment, the determined data transfer rate and the determined size of the electronic mail message may be used to estimate the total transfer time for the electronic message. The estimated transfer time may then be compared to the threshold time and, if the estimated transfer time does not exceed the threshold time, substantially all of the electronic mail message may be selected (at 450).

However, if the estimated transfer time substantially exceeds the threshold time, and it is desirable to transmit only a portion of the electronic mail message, a portion of the electronic mail message having a reduced resolution may be selected (at 450) as described in detail above. In one embodiment, the e-mail management module may also provide the user with an option to select (at 450) the portion of the electronic mail message having a reduced resolution dynamically. For example, the user may select (at 450) the portion of the electronic mail message having the reduced resolution by highlighting a desired portion of the electronic mail message. Alternatively, the user may select (at 450) the portion of the electronic mail message having the reduced resolution by specifying a time interval of an audio clip. In another alternative embodiment, the user may select (at 450) the portion of the electronic mail message having the reduced resolution by specifying a time interval and/or a number of frames of a graphics clip.

In one embodiment, illustrated in FIG. 5B, a dialog box 505 may be displayed to the user, which the user may use to select (at 450) the portion of the electronic mail message having the reduced resolution. However, persons of ordinary skill in the art will appreciate that the present invention is not limited to the dialog box 505. In alternative embodiments, any desirable type of user interface, including a graphical user interface or display, may be displayed to the user in order to provide information to, and/or receive information from, the user. The dialog box 505 may display a list of the e-mails and information associated with the e-mails. For example, as shown in FIG. 5B, one entry (indicated by the phrase "test message" in subject field 510) has a size field 515 that indicates that the size of the e-mail is approximately 3.001 MB and a download time field 520 that indicates that the entire e-mail may take approximately one hour to download at the current connection speed. Various portions and/or attachments may also be displayed in the dialog box 505. For example, the size field 515 indicates that the size of the header is approximately 1 KB and the download time field 520 indicates that the header may take approximately 5 seconds to download at the current connection speed. For another example, the size field 515 indicates that the size of the image_attachment is approximately 1.0 MB and the download time field 520 indicates that the image_attachment may take approximately 20 minutes to download at the current connection speed.

The e-mails, portions thereof, and/or attachments displayed in the dialog box 505 may be determined in a variety of ways. In one embodiment, a user may determine the e-mails, portions, and/or attachments displayed in the dialog box 505. For example, a user may create an e-mail including one or more tags that indicate which e-mail portions and/or attachments should be displayed in the dialog box 505. For another example, a user may highlight a portion of the e-mail by clicking-and-dragging over the desired portion of the e-mail using a controllable pointer element, e.g. a mouse, a joystick, and the like. The user may then indicate that the highlighted portion should be displayed in the dialog box 505 by, for example, selecting an option from a drop-down menu using the controllable pointer element. The e-mail management module may then determine displayable information associated with the e-mails including, but not limited to, the size and estimated download time of the e-mail portions and/or attachments. However, persons of ordinary skill in the art should appreciate that the present invention is not limited to embodiments wherein the user determines the portions and/or attachments displayed in the dialog box 505. In alternative embodiments, the e-mail management module may determine the portions and/or attachments displayed in the dialog box 505. For example, the e-mail management module may determine the portions and/or attachments displayed in the dialog box 505 using information such as the user profile, the device profile, the file size, the connection speed, the estimated download time, and the like.

In one embodiment, the e-mail management module may select (at 450) portions of the e-mails to be downloaded. For example, based upon the user profile 500, the e-mail management module may select (at 450) the "header" of the "test message," the "other message," and the "header" of the "another message," as indicated by the X-marks in selection field 530. Alternatively, the user may select (at 450) portions of the e-mail to be downloaded. For example, the user may control a pointer element on the graphical user display with a pointer controller having position and selection status responsive to operation by the user, such as a mouse, a joystick, and the like, to select (at 450) the image_attachment and the sound_attachment. For example, the user may use a mouse to click the box in the selection field, thereby selecting (at 450) the image_attachment and the sound_attachment, as indicated by the check-marks in the selection field 530.

The dialog box 505 also includes a detail field 550. In one embodiment, the user may opt to view additional information about one or more attachments. For example, the user may control a pointer element on the graphical user display with a pointer controller having position and selection status responsive to operation by the user, such as a mouse, a joystick, and the like, to select (at 450) the magnifying glass icon shown in the detail field 550. In one embodiment, the e-mail management module may use the determined (at 430) file format to display a detailed information box 600 that may include information regarding the attachment, as shown in FIG. 6.

Figure 6:
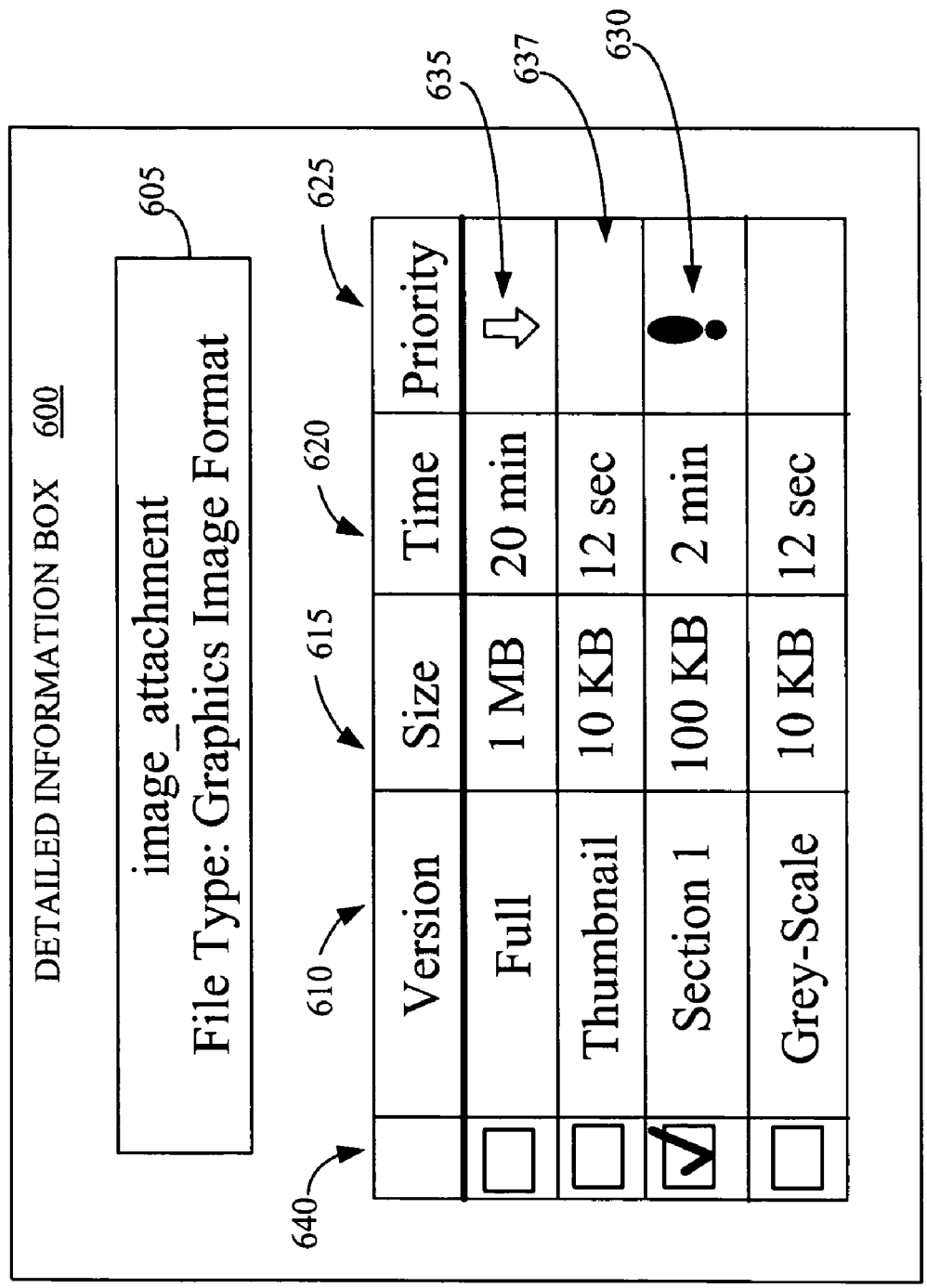
FIG. 6 shows one exemplary embodiment of a detail box, in accordance with one embodiment of the present invention.

The exemplary embodiment of the detailed information box 600 shown in FIG. 6 includes summary information 605, which may include such information as the filename ("image_attachment"), the file type ("Graphics Image Format"), and any other desirable information. Although the exemplary embodiment illustrated in FIG. 6 depicts an image file, persons of ordinary skill in the art should appreciate that the present invention is not limited to image files. In alternative embodiments, any desirable type of attachment may be used, including, but not limited to, the various file types discussed above.

The detailed information box 600 may include information indicative of the content of the attachment. In the illustrated embodiment, this information includes a version field 610 of the attachment. For example, a full-size, full-resolution version of the image_attachment may be available for download, as well as various downcast versions, including a full-size, reduced resolution version, a reduced-size, reduced-resolution (or "thumbnail") version, a reduced-size, full-resolution version, and the like. Alternatively, the color resolution of portions of the attachments may be reduced by the downcast process. For example, the color resolution of an image containing 65K colors may be reduced to a grey-scale image.

In one embodiment, the author of the file may designate portions of the image_attachment to be downcast, as well as the downcasting process, using delimiters such as tags, control characters, and the like, which may be understood by the e-mail management module. For example, the author may select a section of the image_attachment, such as Section 1 shown in FIG. 6. However, the present invention is not limited to user-defined downcasting. In alternative embodiments, the version field 610 of the attachment may be determined in any desirable manner, including parsing by the e-mail management module, and the like.

The detailed information box 600 may also include information indicative of a size of the version in a corresponding size field 615, include information indicative of an estimated download time of the version in a corresponding a time field 620 of each portion, and the like. In one embodiment, the size field 615, the time field 620, and any other desirable information may be determined by the e-mail management module. In alternative embodiments, the detailed information box 600 may also include information not shown in FIG. 6, such as an estimated transfer speed and the like.

A priority level field 625 may also be associated with one or more versions of the attachment. In one embodiment, the priority level field 625 may indicate at least one of a high priority 630 (indicated by an "!"), a low priority 635 (indicated by a downward-pointing arrow), and an average priority (indicated by a blank field 637). However, persons of ordinary skill in the art should appreciate that any desirable number of priority levels may be indicated in the priority level field 625, and the priority levels may be indicated in any desirable manner including other symbols or characters, colors, attention-getting techniques such as flashing and/or beeping, and the like. The user may designate the priority level that is associated with each version of the attachment using delimiters such as tags, control characters, and the like, which may be understood by the e-mail management module. Alternatively, the user may designate the priority level using a pointer controller having position and selection status responsive to operation by the user, such as a mouse, a joystick, and the like, to select a priority level 625 interactively using the detailed information box 600. However, the present invention is not limited to user-defined priority levels. In alternative embodiments, the priority level 625 associated with the portions of the attachment may be determined in any desirable manner. For example, the e-mail management module may assign a default priority level to each portion of the attachment. The designated and/or assigned priority level may then be indicated in the priority level field 625.

One or more portions and/or versions of the attachment may then be selected (at 450). In one embodiment, the one or more portions and/or versions of the attachment may be selected (at 450) based upon indicators in one or more of the size fields 615, the time fields 620, and the priority level fields 625. For example, Section 1 may be selected (at 450), at least in part because of the high priority associated with Section 1, as indicated by the checkmark in the selection field 640. In various alternative embodiments, the one or more portions and/or versions of the attachment may be selected (at 450) by the user, the author, the e-mail management module, or in any other desirable manner. Moreover, the one or more portions and/or versions of the attachment may be selected (at 450) in advance, e.g. using the user profile 500, or dynamically, e.g. by the user at the time that the dialog information box 600 is displayed. In alternative embodiments, the one or more portions and/or versions of the attachment may also be selected (at 450) sequentially. For example, the user may select (at 450) the thumbnail and select (at 450) Section 1 after viewing the thumbnail.

The selected portion of the electronic mail message is then provided (at 460) to, for example, a processor-based device and/or a server, as discussed in detail above. In one embodiment, the e-mail management module may also provide the user with an option to provide (at 460) the selected portion of the electronic mail message. For example, a dialog box may be displayed to the user and the user may opt to provide (at 460) the selected portion or the user may opt not to provide (at 460) the selected portion. In this embodiment, the selected portion of the electronic mail message is provided (460) in response to the user opting to provide (at 460) the selected portion. In one embodiment, the user may also select a minimum resolution, a section of an image, provide alternative text, and take other similar actions.

The electronic mail message may, in one embodiment, be queued and/or stored, e.g. on a client or on a server, after the selected portion of the electronic mail message having a reduced resolution is provided (at 460). The electronic mail message may remain queued until it becomes desirable to provide the complete electronic mail message. Alternatively, the user may request an additional selected portion of the electronic mail message.

In one alternative embodiment, a user may create the electronic mail message on a processor-based device and the selected portion of the electronic mail message having a reduced resolution may be provided (at 460) to a server and/or another processor-based device. For example, the user may select sections of the electronic mail message, or one or more attachments, which may be indicated with tags and the like. As will be appreciated by persons of ordinary skill in the art, tags are special characters that may be inserted in a data stream to indicate the beginning and/or end of portions of the data stream. In one embodiment, tags may be inserted into data content by a creator and/or user to indicate, for example, a preview of the data content, a summary of the data content, and the like. If it is desirable to provide less than the entire electronic mail message, a reduced resolution version of the user selected sections may then be provided (at 460).

The reduced resolution electronic mail message may remain queued and/or stored on the processor-based device until it becomes desirable to provide the complete electronic mail message, or an additional portion thereof, to the server and/or other processor-based device. Alternatively, the electronic mail message may remain queued and/or stored on a server until it becomes desirable to provide the complete electronic mail message. As discussed above, one or more notifications may be provided to the user indicating that the electronic mail message is queued and/or stored.

Figure 7:
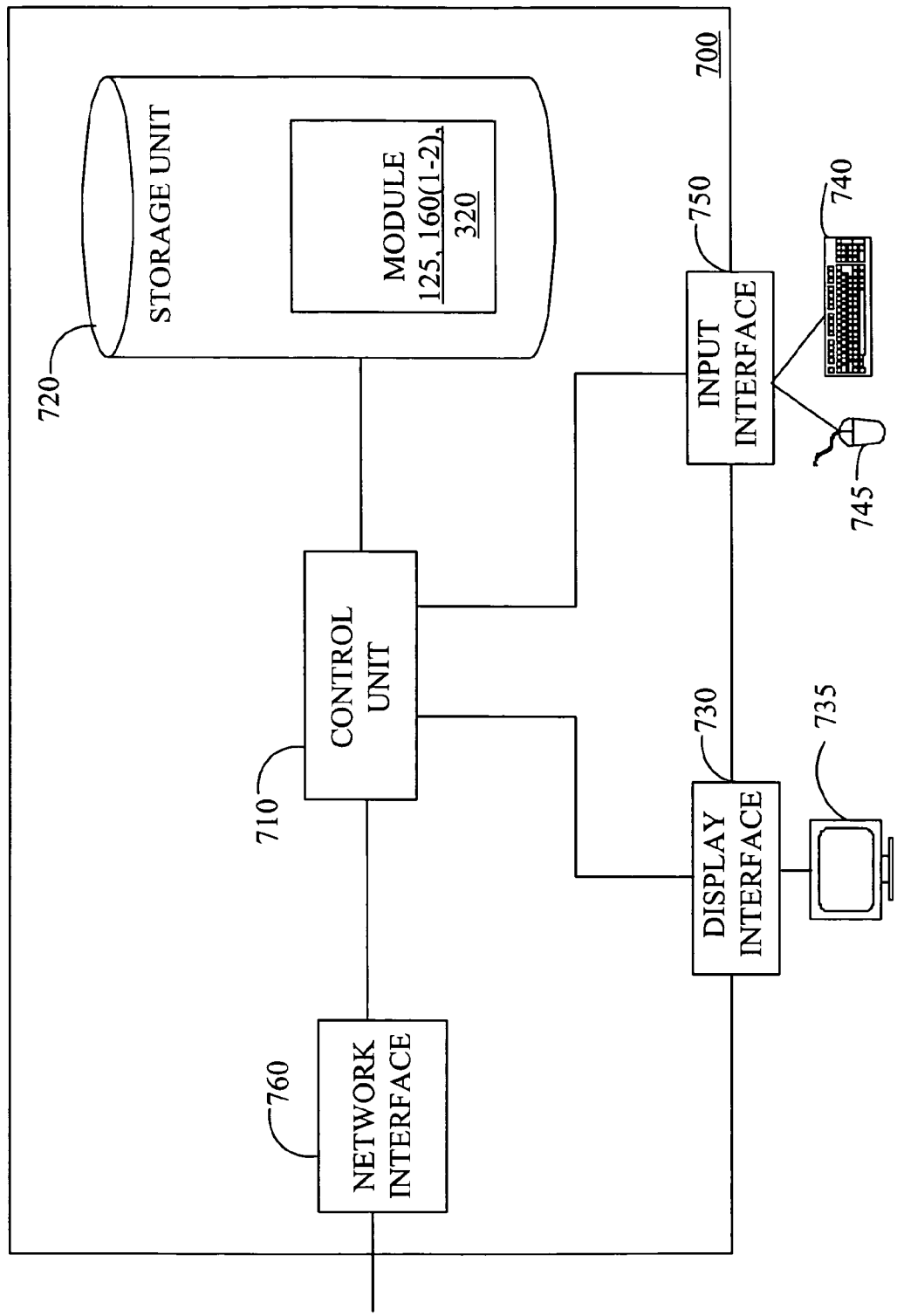
FIG. 7 shows a stylized block diagram of a processor-based device, in accordance with one embodiment of the present invention.

FIG. 7 shows a stylized block diagram of a processor-based device 700, in accordance with one embodiment of the present invention. In one embodiment, the processor-based device 700 may represent portions of the processor-based devices 105(1-2), 301 and/or the servers 110, 305. The device 700, depending on the particular implementation, is configured with the appropriate software configuration, including the e-mail management module 125 or the e-mail modules 160(1-2) of FIG. 1, or with the e-mail management module 320 in the system 301 of FIG. 3.

The device 700 comprises a control unit 710, which in one embodiment may be a processor that is communicatively coupled to a storage unit 720. The software installed in the storage unit 720 may depend on the features to be performed by the device 700. For example, if the device 700 represents one of the processor-based devices 105(1-2), 110, 301, 305 then the storage unit 720 may include the e-mail management modules 125, 320, as well as the e-mail modules 160(1-2). The e-mail management modules 125, 320 and the e-mail modules 160(1-2) may be executable by the control unit 710. Although not shown, it should be appreciated that in one embodiment an operating system, such as Windows®, Disk Operating System®, Unix®, OS/2®, Linux®, MAC OS®, or the like, may be stored on the storage unit 720 and be executable by the control unit 710. The storage unit 720 may also include device drivers for the various hardware components of the device 700.

In the illustrated embodiment, the device 700 includes a display interface 730. The device 700 may display information on a display device 735 via the display interface 730. In the illustrated embodiment, a user may input information using an input device, such as a keyboard 740 and/or a mouse 745, through an input interface 750. The control unit 710 is coupled to a network interface 760, which may be adapted to receive, for example, a local area network card. In an alternative embodiment, the network interface 760 may be a Universal Serial Bus interface or an interface for wireless communications. The device 700 communicates with other devices through the network interface 760. Although not shown, associated with the network interface 760 may be a network protocol stack, with one example being a UDP/IP or a TCP/IP stack. In one embodiment, both inbound and outbound packets may be passed through the network interface 760 and the network protocol stack.

It should be appreciated that the block diagram of the device 700 of FIG. 7 is exemplary in nature and that in alternative embodiments, additional, fewer, or different components may be employed without deviating from the spirit and scope of the instant invention. For example, if the device 700 is a computer, it may include additional components such as a system bus or an I/O bus. In other embodiments, the various elements of the device 700 may be interconnected using various buses and controllers. Similarly, depending on the implementation, the device 700 may be constructed with other desirable variations without deviating from the spirit and scope of the present invention.

The various system layers, routines, or modules may be executable on control units, such as the control unit 710. The control unit 710 may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed or removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit 710 cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method comprising:

determining from transfer criteria whether to provide less than all of an electronic mail message;

selecting a portion of the electronic mail message;

reducing a resolution of the selected portion of the electronic mail message, wherein reducing the resolution of the selected portion of the electronic mail message comprises a part of downcasting a portion of at least one file associated with the electronic mail message;

generating a downloadable, reduced copy of the electronic mail message from the reduced resolution, selected portion; and downloading the reduced copy to a user;

wherein downcasting the at least one file comprises downcasting at least one of an audio file, video file, a multimedia file, an image file, and a graphics file;

wherein selecting the portion of the electronic mail message comprises selecting the portion based upon determining from transfer criteria whether to provide less than all of the electronic mail message;

wherein reducing the resolution comprises reducing the resolution based on transfer criteria;

wherein generating comprises providing to the user information relating to the at least one file associated with the electronic mail message, wherein information relating to the file comprises a filename, a file type, an actual file size, estimated download time, and at least one of a file creation date, a file modified date, version information, color format, color resolution, estimated transfer speed, and a download priority;

further comprising:

identifying a type of the at least one file based on at least one of a file name extension, a file-type-specific plug-in, a transcoder, and an identifier inserted into the file, wherein the inserted identifier comprises indicator characters, control characters and character strings, and wherein identifying a file type based on the inserted identifier comprises parsing the file to determine the identifier;

downloading the reduced copy to a plurality of users;

setting at least one flag indicative of at least one user email handling preference;

downloading the electronic mail message subsequent to downloading the reduced copy, wherein downloading comprises trickle downloading.

* * * * *

UNITED STATES PATENT AND TRADEMARK OFFICE
CERTIFICATE OF CORRECTION

PATENT NO.       : 7,596,285 B2                                      Page 1 of 1
APPLICATION NO. : 10/787981
DATED            : September 29, 2009
INVENTOR(S)      : Brown et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1152 days.

Signed and Sealed this

Twenty-eighth Day of September, 2010

David J. Kappos
*Director of the United States Patent and Trademark Office*